H. D. McGOVERN.
Sun-Shield for Horses.
No. 128,554.
Patented July 2, 1872.
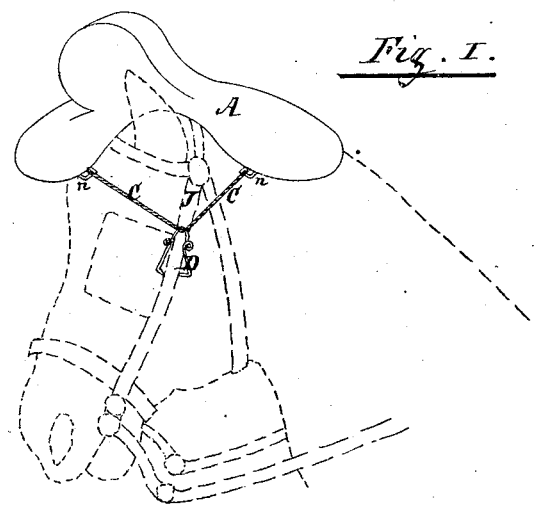
Fig. I.
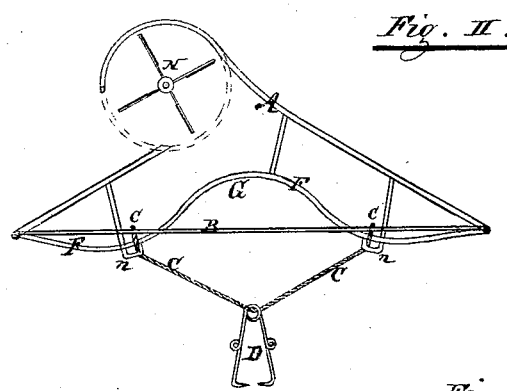
Fig. II.
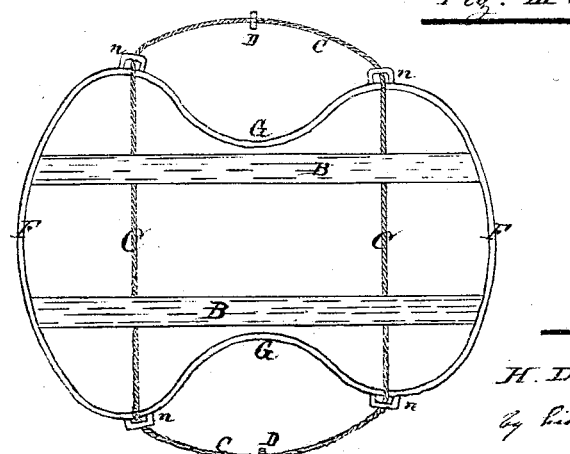
Fig. III.
Witnesses.
C. W. Jordan
J. Christian
Inventor.
H. D. McGovern
by his Attorney
Henry E. Roeder 128,554

UNITED STATES PATENT OFFICE.

HUGH D. McGOVERN, OF BROOKLYN, NEW YORK.

IMPROVEMENT IN SUN-SHIELDS FOR HORSES.

Specification forming part of Letters Patent No. 128,554, dated July 2, 1872.

*To all whom it may concern:*

Be it known that I, HUGH D. McGOVERN, of Brooklyn, Kings county, State of New York, have invented certain Improvements in Sun-Shields for Horses, of which the following is a specification:

This invention consists in improvements of the sun-shield for horses for which Letters Patent were granted to me on the 24th day of October, 1871; and consists in an arrangement of easily attaching and detaching the shield with the bridle or head-gear, together with the arrangement of longitudinal straps or bands to allow the current of the air to pass over the most vital part of the horse's head, and at the same time to keep the shield the required distance from the head of the horse.

In the accompanying drawing, Figure I represents my sun-shield placed on top of the horse's head, showing its connection and attachment with the bridle or head-gear of the horse. Fig. II is a longitudinal section of the sun-shield; and Fig. III is an under-side view of the same.

A represents the shield, composed of wire or other suitable frame-work, covered with any suitable material, more fully described in my former patent. The bottom or main wire F, forming the shield, is bent inward on each side at G, to allow the horse's ears perfect liberty outside of the shield, and at the same time prevent said shield interfering with any part of the bridle or head-gear J, which is always more or less the case when said wire is made straight or parallel at the sides, and comes outside of the horse's ears, when other holes or openings have to be provided to allow the ears to pass through. B B are two straps or bands running lengthwise of the shield, and rest between the horse's ears on its head, supporting the shield in its proper position. The arrangement of these straps or bands B fore and aft, or lengthwise with the shield, instead of transverse, as had been done heretofore, allows the current of air created by the fan-wheel N, in the top of the shield, to cool more effectively those parts of the horse's head which it is desired to protect and cool. On the sides of the shield, on the main wire F of the frame, ears or loops n n are arranged, situated in such a position as to come some distance before and behind the horse's ears. Through these ears n n n n a string, C, is passed, passing on the inside of the shield over the straps or bands B B, and having attached to it on each side, at the space between the ears n n, spring-hooks D. When the shield is placed upon the horse's head these hooks D are attached to any convenient part of the bridle or head-gear, (see Fig. I,) and by the facility of attaching the same either higher up or lower down any desired tension can be brought upon the shield, as said cord or string C passes over the straps or bands B B, which, as before mentioned, pass lengthwise of the shield, and consequently of the horse's head, insure thereby a firmer hold on the same.

What I claim as my invention, and desire to secure by Letters Patent, is—

The two straps or bands B running longitudinal or lengthwise in sun-shields for horses, in combination with a cord, C, passing over said bands, and provided with spring-hooks D, substantially as and for the purpose specified.

H. D. McGOVERN.

Witnesses:
HENRY E. ROEDER,
D. W. JORDAN.